United States Patent [19]
Palmeri et al.

[11] Patent Number: 5,582,558
[45] Date of Patent: Dec. 10, 1996

[54] COMBINED SYSTEM FOR ASSISTING SHIFTING OF MANUAL TRANSMISSION

[75] Inventors: Frank A. Palmeri, Troy; Thomas Desautels, West Bloomfield; Charles E. Allen, Jr., Rochester Hills, all of Mich.; Jon M. Huber, Laurinburg, N.C.; Edward M. Bacon, Northville; Steve M. Weisman, Farmington Hills, both of Mich.; Steven E. Radue, Southern Pines, N.C.

[73] Assignee: Rockwell International Corporation, Pittsburgh, Pa.

[21] Appl. No.: 508,156

[22] Filed: Jul. 27, 1995

[51] Int. Cl.⁶ .................................................. B60K 41/08
[52] U.S. Cl. ...................................... 477/109; 477/111
[58] Field of Search .................................. 477/109, 111

[56] References Cited

U.S. PATENT DOCUMENTS

| | | | |
|---|---|---|---|
| 2,592,375 | 4/1952 | Ball | 477/124 |
| 2,622,711 | 12/1952 | Chambonneau | 477/73 |
| 2,940,559 | 6/1960 | Bomhard | 477/89 |
| 3,171,300 | 3/1965 | Perkins et al. | 74/745 |
| 3,272,028 | 9/1966 | Randol | 477/85 |
| 3,323,621 | 6/1967 | Peras | 477/77 |
| 3,327,553 | 6/1967 | Peras | 477/102 |
| 3,335,830 | 8/1967 | Castelet | 477/77 |
| 3,349,878 | 10/1967 | Castelet | 477/77 |
| 3,402,793 | 9/1968 | Scholl | 477/175 |
| 3,667,577 | 6/1972 | Weymann | 477/77 |
| 3,752,284 | 8/1973 | Brittain et al. | 192/103 F |
| 3,792,630 | 2/1974 | Hause | 477/102 |
| 3,939,722 | 2/1976 | Stromberg | 74/336 R |
| 3,939,738 | 2/1976 | Adey et al. | 477/109 |
| 4,009,699 | 3/1977 | Hetzler et al. | 123/416 |
| 4,019,614 | 4/1977 | Prenzel et al. | 192/103 F |
| 4,034,627 | 7/1977 | Mizote | 477/148 |
| 4,077,283 | 3/1978 | Hammond | 477/111 |
| 4,081,065 | 3/1978 | Smyth et al. | 477/176 |
| 4,200,007 | 4/1980 | Espenschied et al. | 477/110 |
| 4,223,573 | 9/1980 | Franssen | 477/109 |
| 4,226,141 | 10/1980 | Espenschied | 477/109 |
| 4,266,447 | 5/1981 | Heess et al. | 477/101 |
| 4,294,341 | 10/1981 | Swart | 477/78 |
| 4,295,551 | 10/1981 | Zimmermann et al. | 477/89 |
| 4,331,226 | 5/1982 | Heidemeyer et al. | 477/175 |
| 4,343,387 | 8/1982 | Hofbauer | 477/89 |
| 4,380,938 | 4/1983 | Olson | 74/473 R |
| 4,388,843 | 6/1983 | Teeter | 74/745 |
| 4,401,200 | 8/1983 | Heidemeyer et al. | 477/176 |
| 4,403,682 | 9/1983 | Norris et al. | 477/175 |
| 4,493,228 | 1/1985 | Vukovich et al. | 477/109 |
| 4,527,447 | 7/1985 | Richards | 477/78 |
| 4,544,057 | 10/1985 | Webster et al. | 477/86 |
| 4,550,627 | 11/1985 | Lauer et al. | 74/475 |

(List continued on next page.)

FOREIGN PATENT DOCUMENTS

| | | |
|---|---|---|
| 967268 | 5/1975 | Canada . |
| 2022768 | 11/1970 | Germany . |
| 2106060 | 8/1971 | Germany . |
| 2217482 | 4/1972 | Germany . |
| 2622927 | 12/1976 | Germany . |
| 2018917 | 4/1979 | United Kingdom . |
| 9102912 | 3/1991 | WIPO . |

*Primary Examiner*—Dirk Wright

[57] ABSTRACT

A vehicle drive incorporates a speed control that assists an operator in shifting the transmission without requiring the clutch, or synchronization of engine speed. An operator is provided with a single switch that allows a prediction of the next shift direction, and also a request for torque elimination to begin a gear shift. The electronic control unit modifies the engine fueling to a predicted value to achieve a zero torque load, thus allowing the operator to move the transmission to neutral. The transmission is provided with a neutral switch that provides a positive signal to the electronic control unit of when the transmission is in neutral and when it is engaged. Once the electronic control receives the neutral signal, it begins to modify the engine speed to achieve the desired synchronization speed. The operator is thus able to engage the new gear. Once the new gear is engaged, control over the engine returns to the operator.

34 Claims, 8 Drawing Sheets

U.S. PATENT DOCUMENTS

| | | | |
|---|---|---|---|
| 4,567,758 | 2/1986 | Reynolds et al. | 73/150 A |
| 4,593,580 | 6/1986 | Schulze | 477/109 |
| 4,722,248 | 2/1988 | Braun | 477/78 |
| 4,788,875 | 12/1988 | Genise | 74/334 |
| 4,811,224 | 3/1989 | Kuerschner et al. | 364/424.1 |
| 4,854,433 | 8/1989 | Tellert | 477/86 |
| 4,944,197 | 7/1990 | Stine et al. | 74/477 |
| 4,971,183 | 11/1990 | Tellert | 477/86 |
| 4,974,474 | 12/1990 | Newbigging | 477/122 |
| 5,033,324 | 7/1991 | Glaser | 74/473 R |
| 5,038,627 | 8/1991 | Schwaiger et al. | 74/335 |
| 5,042,314 | 8/1991 | Rytter et al. | 74/335 |
| 5,072,629 | 12/1991 | Hirukawa et al. | 477/101 |
| 5,089,965 | 2/1992 | Braun | 364/424.1 |
| 5,099,711 | 3/1992 | Langbo et al. | 74/336 R |
| 5,172,603 | 12/1992 | MacInnis | 74/335 |
| 5,172,604 | 12/1992 | Monette et al. | 74/335 |
| 5,186,066 | 2/1993 | Pankratz et al. | 74/335 |
| 5,193,410 | 3/1993 | Stine et al. | 74/336 R |
| 5,199,312 | 4/1993 | Huggins et al. | 74/335 |
| 5,199,314 | 4/1993 | Hutchison | 74/335 |
| 5,216,931 | 6/1993 | Hirsch et al. | 74/477 |
| 5,218,878 | 6/1993 | Monette et al. | 74/335 |
| 5,222,404 | 6/1993 | Stine | 74/335 |
| 5,224,392 | 7/1993 | Hutchinson et al. | 74/335 |
| 5,231,895 | 8/1993 | Stine | 74/745 |
| 5,263,379 | 11/1993 | Newbigging et al. | 74/336 R |
| 5,487,004 | 1/1996 | Amsallen | 477/109 |

COMBINED SYSTEM FOR ASSISTING SHIFTING OF MANUAL TRANSMISSION

BACKGROUND OF THE INVENTION

This invention relates to a combined system that simplifies the required operations for shifting a manual transmission between speed ratios.

Heavy vehicles typically include a multi-speed transmission controlled by a manual stick shift. An engine drives the transmission through a selectively-actuated clutch. The operator selects one of several transmission speeds to result in various speed ratios between input from the engine and the output speed of the transmission.

In trucks there are typically ten or more different speed ratios available in a transmission. In shifting between the speed ratios, an operator may sometime sequentially pass rapidly through the several speeds. As an example an operator speeding up the vehicle may quickly pass through many of the gears in rapid succession.

The operation typically required to smoothly shift a truck transmission is relatively complex. Initially, a driver actuates the clutch to eliminate the torque transmission from the engine to the transmission. Transmissions are typically shifted between different speed ratios by sliding one toothed member relative to another. While torque is transmitted, there is a high torque load on the toothed members resisting any such movement. The clutch interrupts or breaks the torque transmission such that the operator is able to move the toothed members relative to each other. Thus, the driver actuates the clutch and moves the gears relative to each other to a neutral position. The driver then typically releases the clutch and attempts to synchronize the speed of the engine with the speed necessary at the next selected speed ratio to achieve a synchronous or smooth and continuous speed at the transmission output. That is, the driver attempts to achieve an engine input speed that matches the new speed ratio. If this does not occur, there is a "jerkiness" at the engagement of the new gear that is transmitted into uneven travel speed for the vehicle, and grinding of the transmission elements. A good deal of operator experience is required to even approximate synchronization of the speed ratio. If the driver cannot approximate the speed the shift cannot be completed. Moreover, the speed synchronization typically cannot be achieved identically and the operator again actuates the clutch as the new gear is being engaged. This multi-step method of shifting gears is relatively complex. Further it relies upon an experienced operator who has a feel for the desired speed at the next selected gear. As vehicles become equipped with additional controls for other driving operations, operators are required to perform more complicated operation steps. A typical truck driver today is also less experienced than in the past. These inexperienced operators will often lack sufficient experience for the speed synchronization and steps required to shift as described above.

The prior art has proposed systems that attempt to predict the engine speed that would be necessary at the next speed ratio and begin to move the engine speed to the desired speed to achieve speed synchronization. These systems have also proposed eliminating the need for actuating the clutch to move the transmission to neutral by measuring and attempting to achieve a zero torque speed for the engine. That is, there is an engine condition at which there is no torque transmitted to the transmission. At that condition, the operator will theoretically be able to move the gear out of engagement since no torque is holding the members in place.

These systems have typically been more "proposed" systems rather than practical production systems. One major failing of these systems is that it is difficult to identically measure or predict the zero torque condition or the synchronization speed. Also, the required torque meter would be expensive and difficult to maintain. Instead, both change with time. Moreover, the proposed systems generally assume that the engine control will always know what speed the transmission is in. In many of these systems, the operator is not provided with the ability to selectively use the clutch and complete a transmission shift manually as in the prior art. It is important to leave the operator with that option.

Also, the proposed prior art systems have not provided an operator with the ability to skip shift, or perform several shifts at once. The controls proposed in the prior art are not equipped to handle such a multiple shift and still synchronize speed.

There is also inadequate fault detection on the signals that an operator may send to the control. In any system that modifies the speed of the vehicle without operator control, it is most important to have fault detections on the signals that actuate the system. The prior art has not adequately provided fault detection.

In addition, the prior art has not proposed systems that will decelerate the engine rapidly when necessary. It is easier to rapidly increase the engine speed than to rapidly decrease the engine speed, as decreasing engine speed requires the elimination of rotational momentum. Full engine power is available to speed up, while friction must achieve most of the speed decrease. One cannot move engine fueling to a negative value.

Moreover, the proposed systems do not adequately allow for miscommunication between the operator and the control. A practical system must continue to monitor operator inputs during synchronization and assist the operator in shifting as necessary.

Finally, the prior art has not proposed a system that will have sufficient information relative to the current state of the transmission. A system should not modify engine speed until the transmission is in neutral. If the transmission is in gear and the engine control begins to increase the speed to synchronize the engine speed, the vehicle speed would increase unexpectedly. This would of course be undesirable. While recognizing this requirement, the prior art systems have not provided sufficient feedback and fail-safe monitoring of the state of the transmission.

SUMMARY OF THE INVENTION

A disclosed embodiment of this invention incorporates an electronic control unit for the engine which monitors system variables, and receives operator input signals. While only a single control is disclosed, the invention does extend to separate controls for the several inventive systems. An operator provides the electronic control unit with a prediction of whether the next shift is likely to be an upshift or a downshift. Further, the operator is provided with a switch to request torque elimination to move the transmission to neutral. Fault detection systems are associated with these operator signals to ensure that there is little likelihood of a false reading by the electronic control unit. The signals are preferably sent through a circuit that results in a distinct analog value for each combination of inputs. In one inventive aspect of this invention, the fault detection comprises comparing the analog value to expected values based upon combinations of signals to determine whether the signals as monitored by the electronic control unit fit within one of the expected values of signals.

The electronic control unit periodically monitors the output speed of the engine and the output speed of the transmission to define a current speed ratio. That current speed ratio is compared to expected ratios in a look-up table. The electronic control unit periodically stores and updates the currently engaged gear based upon this comparison. The operator switch is also monitored by the electronic control unit, and a next expected gear is defined based upon the operator shift intent and the currently engaged gear. Once the transmission is moved to neutral, the electronic control unit determines the next expected gear, searches the look-up table for the speed ratio at that gear, and then defines a synchronization or desired engine speed by multiplying the transmission output speed by the next expected speed ratio.

When a torque elimination request is received by the electronic control unit, a predicted zero torque parameter is determined based upon several system variables. Preferably, engine fueling is the parameter that is utilized. The predicted zero torque fueling is a very reliable method of identifying the zero torque fueling. The prior art system of monitoring the torque is somewhat impractical. A "dithering" or variation above and below the predicted zero torque fueling is also used. With dithering, the actual engine fueling periodically crosses the actual zero torque fueling. At any one of those repeated crossings, the operator will be able to move the transmission to neutral.

An inventive neutral switch provides the operator with a positive signal of when the transmission is engaged, and a second positive signal of when the transmission is in neutral. The electronic control unit waits until it receives a positive signal that the transmission is in neutral before it begins to modify the engine speed to the desired synchronization speed. Moreover, fault detection techniques are incorporated into the electronic control unit to ensure that the proper sequence and timing between receipt of the gear-engage and neutral switch signals. The fault detection techniques are also inventive.

If the shift is an upshift, the electronic control unit must rapidly decrease the engine speed to the speed that will be necessary at the next selected gear. To accomplish this rapid deceleration the electronic control unit actuates an engine speed retardation system. In one example, the electronic control unit may actuate an engine braking subsystem. The engine braking subsystem absorbs power otherwise delivered to the engine output shaft, and hence decreases speed. Alternatively, additional loads may be placed on the engine shaft such as the actuation of a fan, an exhaust brake valve or the shunting of power to an alternator.

Once the electronic control unit has determined the synchronization speed, a small offset is added to the speed such that the desired engine speed is not identical to the synchronization speed. It is possible that if the engine speed was identical to the synchronization speed, and the teeth on the members to be engaged were slightly out of alignment, the teeth would never be brought into alignment. With the small offset between the speeds, any difference between the position of the gear teeth is quickly compensated for as the operator begins to re-engage the gears.

In addition, the engine speed is preferably varied above and below the predicted synchronization speed as the transmission begins to move towards an engaged position. In this way, the system will ensure that the engine speed will periodically cross the actual synchronization speed and the driver will be able to re-engage the gear.

In another aspect of this invention, the operator is provided with the ability to change the shift intent after the transmission is in neutral. If the driver changes the shift intent once the transmission is in neutral, the electronic control unit recalculates the next gear. The speed synchronization then begins again, and the operator moves the transmission to the new gear. The system may limit the number of direction changes. If multiple changes of the shift intent exceed the limit, the electronic control unit returns the control of the engine to the operator.

In another operation, the electronic control unit provides a "second chance" to select a gear for the operator to complete a shift. This ability is actuated once a timer to synchronize speed and engage the gear expires, or if movement to neutral relied upon the clutch. Once the transmission is in neutral and the other conditions are met, if the operator is having difficulty completing the shift, the operator is able to actuate the torque elimination request switch to request assistance. The electronic control unit reads this signal as a request for second chance shift assistance. The electronic control unit identifies an ideal gear based upon the transmission speed, the prior gear, and other system operations. The electronic control unit then drives the synchronization speed to the speed which would be required at that gear. The operator must manually find the gear. There is no limit to the times an operator can request second-chance shifting.

These and other features of the present invention will be best understood from the following specification and drawings, of which the following is a brief description.

DETAILED DESCRIPTION OF A PREFERRED EMBODIMENT

Figure 1A:
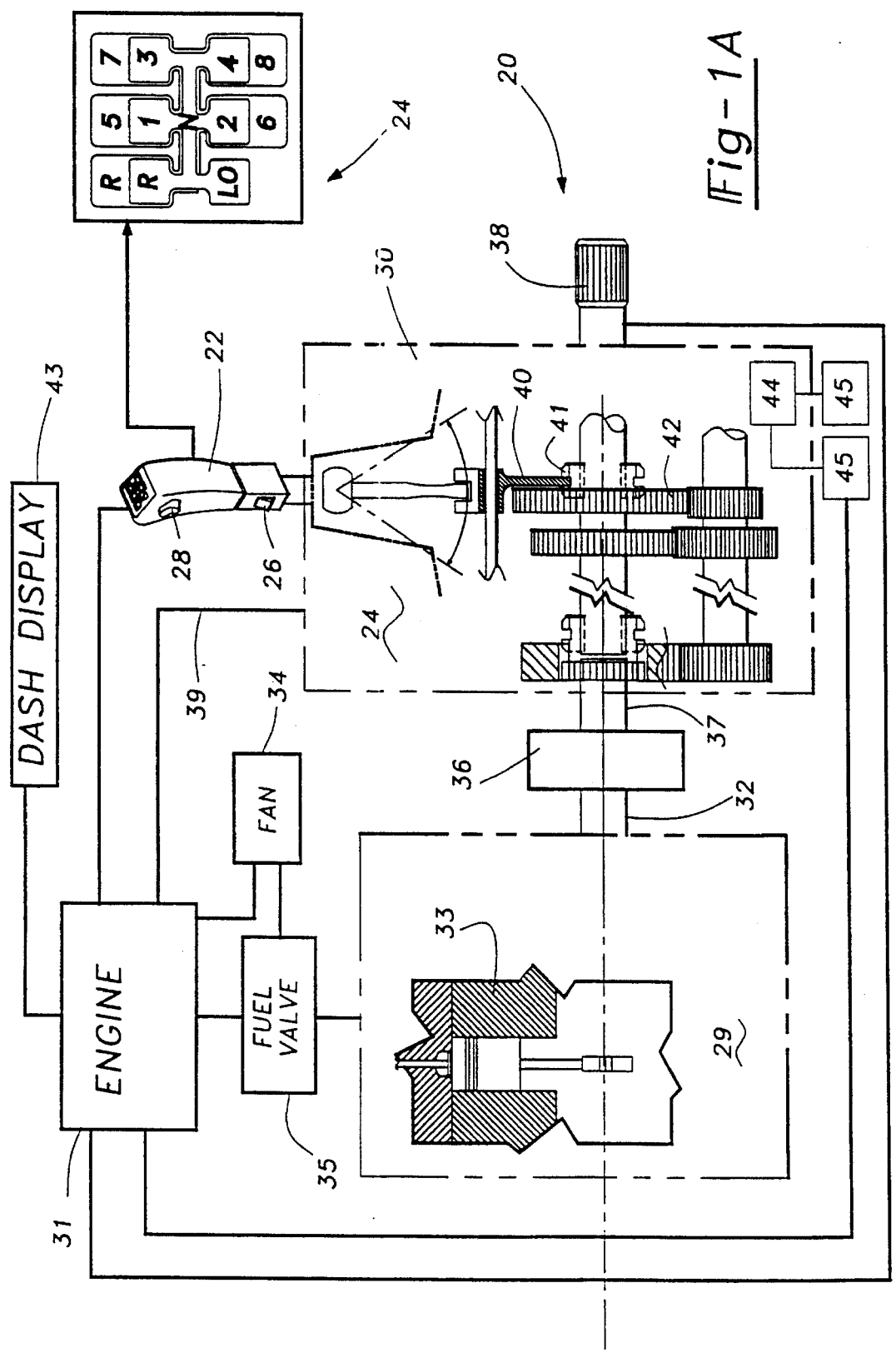
FIG. 1A is a schematic view of an overall system for accomplishing the present invention.

A vehicle drive 20 is illustrated in FIG. 1A. A manual stick shift 22 allows an operator to change a speed ratio between an engine and a transmission output among the several speed ratios shown by diagram 24. A shift assist system switch 26 allows an operator to enable or disable an engine control system for assisting in shifting the manual transmission between the speed ratios. An operator input switch 28 allows an operator to provide an indication of the next gear shift, and also to request assistance in moving the transmission to neutral. Multi-speed transmission 30 may be of a type known in the art, and includes toothed members which slide relative to each other to engage any one of several speed ratios.

An engine 29 has an electronic control 31 controlling the speed of the engine at the output shaft 32. Although this invention discloses a signal engine control for normal operation and for assisted shifting, separate controllers may be used. Also, some of the subsystems may be controlled by separate controllers. An engine braking subsystem 33 shown schematically, may be incorporated into the engine 29. In known engine braking subsystems, the outlet valves on selected one of the piston cylinders in the engines are opened near the end of the compression stroke. The compressed gas escapes. The engine braking absorbs power from the engine to compress the gas prior to release. In this way, the speed at the engine output shaft 32 is reduced. Engine braking has typically been utilized to assist a heavy truck in braking to stop or when traveling downhill. The inventive system incorporates engine braking as a speed retardation feature on an upshift to allow rapid reduction of engine speed. As an alternative or a complement to engine braking 33, the electronic control unit 31 may also selectively actuates other loads to drain power from the engine 29. As one example, a fan 34 may be actuated. In other examples, transmission braking exhaust valves may be actuated or a shunt resistor could be actuated to an alternator to dissipate power from the engine. Other types of additional loads on the engine, may also be incorporated into this aspect of the invention.

The electronic control unit typically controls the output speed of the engine output shaft 32 by means such as controlling the fuel flowing through fuel injector 35. The algorithms and controls for this feature are known. A standard engine control available from Detroit Diesel Corporation under the trade name DDEC III may be utilized, and modified to provide the inventive aspects of this invention.

A clutch 36 is selectively actuated by the operator and transmits or breaks transmission drive from engine shaft 32 to transmission input shaft 37. Transmission 30 includes a plurality of speed ratios that change the ratio of the speed at input shaft 37 relative to output shaft 38. As shown, electronic control unit 31 receives a signal of the speed of shaft 32, shaft 38, and also a signal 39 indicating whether the transmission is in a gear-engaged mode or in a neutral mode. The details of signal 39 will be shown in greater detail below. The electronic control unit 31 also receives other inputs such as accelerator position and brake and clutch pedal condition.

Transmission 30 may be of the type including a yoke 40 which slides a toothed collar 41 relative to a selected gear 42. There are typically several gears 42 that are selectively connected by collar 41 to drive output shaft 38. By selecting a certain gear 42 an operator is able to select a desired speed ratio between the shafts 37 and 38. As shown, the transmission is engaged. Rotational drive is transmitted to the shaft 38 through the engaged gear 42. Thus, there is a high-torque load preventing sliding movement of the collar 41 relative to the gear 42, as would be required to move the transmission to neutral and begin movement towards a newly selected gear. The present invention addressed this torque load as described below.

Transmissions typically have several gears 42, any of which may be selected to provide a particular speed ratio. Rather than having upwards of ten individual gears, transmissions typically have a high and low range. The high and low ranges allow each gear 42 to be driven at a low speed and a high speed, thus effectively multiplying by two the number of speed ratios available for transmission 30. A dash display 43 may display the engaged gear and other information as described below.

A range shift mechanism 44 is illustrated schematically in this figure, and will be described in greater detail below. Control solenoids 45 for affecting range shifting through mechanism 44 are controlled by the electronic control unit 31.

Figure 1B:
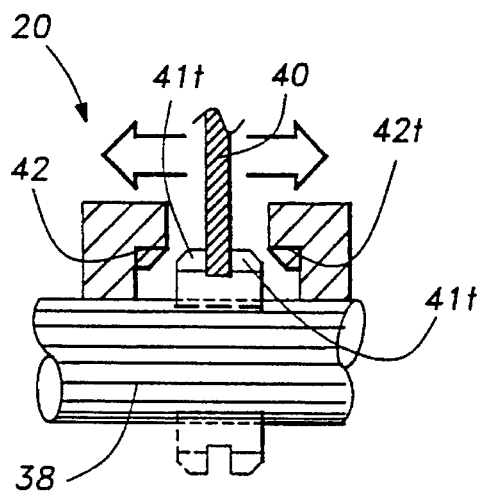
FIG. 1B shows a portion of the FIG. 1A transmission.

As shown in FIG. 1B, there are two aspects of shifting a transmission that typically require operation of the clutch 36. One type of transmission is illustrated in FIG. 1A and 1B, but the present invention would extend to other types of manual transmissions. First, as can be visualized between FIGS. 1A and 1B, when shift collar 41 is engaged on gear 42, teeth 41t on the shift collar 41 engage teeth 42t on the gear 42.

When teeth 41t are engaged with the teeth 42t rotational drive is transmitted from gear 42 to shaft 38. This creates a high-torque load on collar 41 and gear 42. The collar 41 is illustrated in a neutral position in FIG. 1B, with neither gear 42 engaged. To begin movement between the two gears 42 to affect a speed change, collar 41 must initially be brought out of engagement from the FIG. 1A position to the FIG. 1B position. However the high-torque load resists disengagement of teeth 41 from the teeth 42t.

Moreover, when reengaging collar 41 with a gear 42, an operator must attempt to synchronize the speed of gear 42 and collar 41 as collar 41 approaches the gear for engagement. The several gears 42 are all rotating at a speed dependent on the input speed from the engine. The gears 42 are all rotating, however, at different speeds relative to each other. To achieve as smooth a ride as possible, the speed ratio on the shaft 38 should be relatively constant during a transmission shift. After a transmission shift the collar 41 rapidly moves to the speed of the newly engaged gear 42. Also, if the collar 41 and the newly engaged gear are not at approximately the same speed it is difficult to engage the new gear. As such, it would be desirable to synchronize the speed of the gear 42 that is to be engaged with the output speed of the transmission 42, such that when the teeth 41t are brought into engagement with the teeth 42t, they are rotating at approximately the same speed. There will be little grinding on the teeth, and further the speed ratio on the transmission output shaft 38 is relatively constant such that the drive is relatively smooth. Also, the operator will not need to use the clutch to re-engage the transmission.

Figure 2:
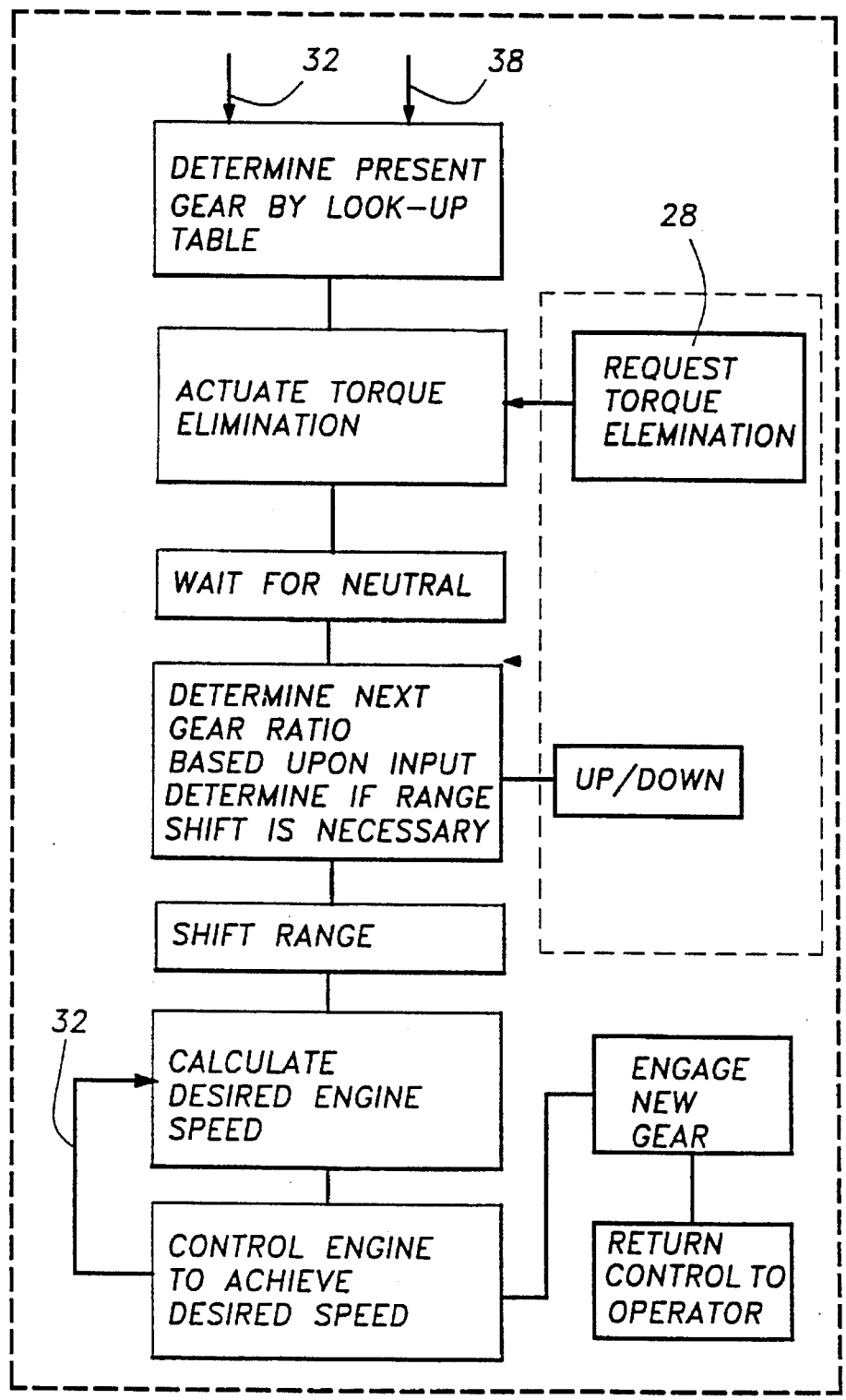
FIG. 2 is a schematic flowchart of the main features of this invention.

FIG. 2 is a flowchart of a system for achieving the above-discussed goals. The electronic control unit 31 monitors the speed of the engine output shaft 32 and the speed of the transmission output 38 to determine a currently engaged gear. The electronic control unit 31 makes this determination by monitoring the actual speed ratio and comparing that actual ratio to expected ratios in a look-up table. The look up table of the transmission speed ratios is preferably stored and accessible to the electronic central unit. Alternatively, an equation based determination may be used. If there is a match, the electronic control unit stores the currently engaged gear. The "match" preferably anticipates a margin of error or range of values for each gear. If the periodic monitoring indicates that the engaged gear changes, the stored currently engaged gear is updated. Since the present invention allows an operator to disable the system through on/off switch 26, it is possible that an electronic control unit would be unable to easily "remember" the gear-engaged based solely on counting shifts. The present invention allows an operator to complete shifting without the control by utilizing a clutch. As such, the periodic monitoring of the currently-engaged gear provides more accurate information.

When an operator begins to actuate a speed ratio change, the operator may request torque elimination through switch 28. If the operator requests torque elimination, the electronic control unit predicts a zero torque engine parameter, such as fueling and begins to drive the engine to that fueling. The operator begins to move the gears out of engagement, and when the engine fueling is at the zero torque fueling, the operator will be able to easily move the transmission gears out of engagement. As will be described in more detail below, the transmission is provided with a signal 39 when the transmission is engaged and when in neutral. Once the gears are out of engagement, the electronic control unit will receive a signal 39 that the transmission is now in neutral. Moreover, given the details of the inventive neutral switch of this invention the electronic control unit will have an indication of a transition period between the neutral and engaged positions.

A timer is set that counts the time from the request for torque elimination until movement to neutral. The timer is stopped when a signal is received that the transmission is in neutral. After an expiration of a predetermined period of time, torque or fueling modification is stopped if there is no movement to neutral. Moreover, should the operator reactuate the torque elimination request while the fueling modification is ongoing, the timer will be reset. This periodic reactuation of the torque elimination request signal allows an operator to indicate a "skip shift" as set forth below. If repeated actuation of the torque elimination request switch occurs after expiration of the timer, the transmission is in neutral, and other conditions are present, then the repeated actuation might be read as a request for second chance assistance as described below.

The operator may also move the transmission to neutral without utilizing the torque elimination request. An experienced operator may be able to achieve or approximate the zero torque load by utilizing the accelerator or the cruise control. In such cases, the electronic control unit 31 operates as with assisted movement to neutral to synchronize speed. If the operator does utilize the clutch to move toward neutral, then the speed synchronization is preferably not applied for that shift. Alternatively, the clutch may be used in some systems to move to neutral and still allow synchronization.

The electronic control unit then determines the next speed ratio to be engaged. A up or down shift intent signal is received from the operator input switch 28. The torque request portion of the operator input switch can also be repeatedly actuated as described below to indicate that multiple shifts might occur at one time. This practice of so-called "skip shifting" occurs when an operator may shift through two or three gears on one shift movement. If the electronic control unit receives a signal that a multiple shift will occur, the next gear ratio is determined based upon adding the number of multiple shifts to the currently engaged gear. Moreover, the electronic control unit determines whether a range shift will be necessary based upon the next expected gear by comparing the currently engaged gear to the next expected gear.

The electronic control unit then determines the desired engine speed at the next gear to be engaged. This calculation is made by comparing the speed ratio at the next expected gear, and multiplying that ratio by the current transmission output speed. The speed ratio is available in the look up table or through equations. This provides a desired engine input speed to achieve a smooth or synchronized shift.

The electronic control unit then begins to control the engine speed to achieve the synchronized desired engine speed. If a range shift is to occur the electronic control unit actuates a shift mechanism to shift the range between the high and low ranges. As the electronic control unit 31 moves the actual engine speed to approximate the desired speed and match the desired speed ratio, the operator will be able to engage the new gear without any unsmooth vehicle speed, and without grinding of the gear teeth. The determination of the desired engine speed is an iterative process as transmission speed will continue to change. Once the gear is engaged, a signal 39 is sent to the electronic control unit 31 that the gear is re-engaged. Although an inventive neutral switch is disclosed, the invention does extend to other types of signals. At that time, the electronic control unit returns control of the vehicle speed to the operator.

The electronic unit 31 is preferably provided with an algorithm to transition between driver control of the engine to the torque elimination when the torque elimination is requested; an algorithm to transition between the torque elimination speed and the synchronization speed; and, further, an algorithm to transition between speed synchronization back to the driver controlled speed once the gear is re-engaged.

Figure 3:
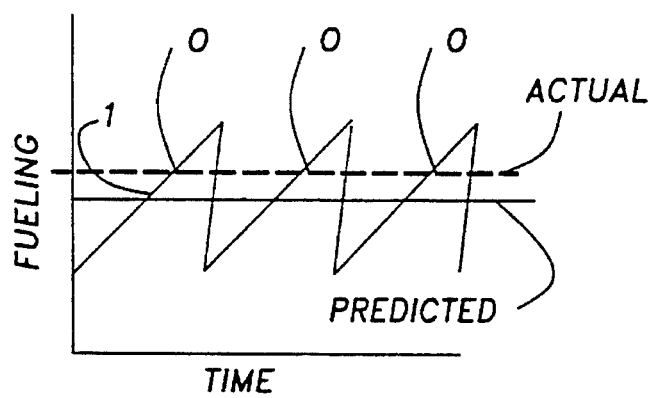
FIG. 3 is a graph showing one aspect of the present invention.

The achievement of the torque elimination feature is illustrated graphically in FIG. 3. Ramp 1 is the actual engine fueling. The dotted line is the actual zero torque fueling necessary to achieve a zero torque load on the connection between the engine and transmission. In this invention, the electronic control unit predicts a zero torque fueling based upon several system variables. The actual engine fueling is then varied above and below that predicted value by a small percent of the predicted value. The predicted value is based on several components as described below. By varying the actual engine fueling above and below this predicted value the actual engine fueling will periodically cross the actual zero torque fueling, such as at points 0. At any one of those points, the operator will be able to easily move the transmission out of engagement to neutral.

The predicted zero torque value is calculated based upon several vehicle operation variables weighted by constants. The determination of the constants can be achieved by real world testing of the particular unit that is to incorporate the electronic control unit, and may vary with the engine transmission or other system components.

In a most preferred embodiment of this invention, the predicted zero torque speed is determined as follows:

predicted zero torque value=friction torque component+ unbalanced torque component+cold torque adjustment+fan loss adjustment+an air conditioning load factor+dither torque+torque offset.

The friction torque component is a function of the engine speed, and is determined from a tabulated look-up table of the friction influence at various engine speeds. The friction torque component is the main component of the predicted zero torque speed. It is possible that only this component would be necessary, particularly because of the variation. The component includes an amount arrived at for a particular engine speed. The look-up table could be prepared by driving an engine with a torque gauge on the output of the engine, and varying the engine speed. The torque is read and the table is prepared assuming other variables to be constant.

The unbalanced torque is defined by the engine inertia multiplied by the gear ratio at the presently-engaged gear, multiplied by the acceleration of the transmission output. Preferably, acceleration of the speed of the transmission output is filtered using an acceleration filter constant. The engine inertia factor is determined by running the engine with the transmission in neutral at a high speed and then releasing the accelerator. The effect of this acceleration on the torque is then used to determine an engine inertia constant.

The cold temperature adjustment takes into account that the torque required to drive a cold engine will be greater than a warm engine. Oil is more viscous when cold. The cold torque adjustment includes a constant multiplied by the oil temperature, multiplied by a factor related to engine speed. The engine speed factor may be the square of the engine speed, or the relationship could be linear. Most preferably, it is a linear relationship.

The fan loss is also determined by a constant times a factor related to the engine speed. This factor may be the engine speed squared, or could be a linear factor. Most preferably, the relationship is squared. If the fan is off, this component is set at zero.

The air conditioning load value may be a constant determined by running the engine with the air conditioning on and determining the additional torque required to power the air conditioner. The air conditioning load constant may be added or not added dependent on whether the ECU senses the air conditioning is on or off. Alternatively, the air conditioning load might also be dependent on speed in some applications.

The constants for the cold temperature adjustment and the fan loss are also determined by maintaining all other variables constant and determining the torque as the particular variables change. In this way, the constants are determined and programmed into the electronic control unit.

One main feature of the present invention is the realization that a predicted or measured zero torque speed will often be inaccurate. Moreover, the zero torque engine speed changes with time, and any measurement or calculation will possibly be inaccurate by the time the actual engine speed has been adjusted. The present invention recognizes and addresses this problem by varying the engine speed above and below the predicted zero torque engine speed.

The dither factor incorporates the variation above and below the predicted value as discussed above. Preferably, the dither value varies a small percentage of the predicted value (in one example four percent) both below and above the predicted value. Most preferably, the dither is incorporated into the engine fueling in a saw tooth fashion, such that the engine speed begins on one side of the predicted value, moving up from the greatest amount of dither to cross the predicted engine speed, and then continues on a single slope to the other extreme. The engine fueling then returns to the initial point such that the profile of the engine fueling has a ramp on a front end and then a direct downward component on the other end as shown in FIG. 3. In this way, the profile will cross the actual zero torque value more frequently. As an example, as shown in FIG. 3, the profile repeatedly crosses the actual zero torque value at points 0. If the front end of the profile did not recently cross the actual zero torque value, it is unlikely that simply returning the profile back at an angle towards the lower-most point, would result in a crossing of the zero torque value until near the end of the ramp. Stated another way, if the end of the ramp labeled "1" does not cross the actual zero torque value above the predicted value, it is unlikely that the return, if ramped, would cross the zero torque value until it reached below the predicted value. For that reason, the saw tooth shape utilized in this invention that returns the profile directly downwardly to its initial point, after reaching the upper-most point, is most likely to have frequent crossings of the actual zero torque value. A look-up table with a column for time-based variation is used to obtain the changing dither amounts.

Preferably, the dither factor is only utilized when one gets close to the predicted value. As one alternative, a "blip" may be utilized immediately after receipt of the request for torque elimination. The blip would increase the torque load momentarily, and then drop the torque load down to include the dither value and the transition toward the predicted zero torque value. This torque would assist in moving the system to a condition such that the zero torque value would not require a negative fueling. A negative fueling is of course not possible, and thus by utilizing the blip, the possibility of a negative fueling requirement may be eliminated. In addition, it may be desirable that the transition from the operator control to the zero torque value not be achieved with constant change, but rather than an exponential decay be utilized. The exponential decay may have some beneficial results in achieving the actual zero torque value more rapidly. After a set time, the dither is actuated as described above. The time constant for ending the exponential decay and beginning the dither, and also the frequency of the dither may vary with the gear ratio. Moreover, those factors may vary with the range of the transmission.

As an alternative to the saw tooth profile, a ramp up and then a ramp back down, or sinusoidal relationship may be utilized.

Finally, the time between the initiation of the torque reduction and the beginning of the dithering may also vary with the amount of driver force on the accelerator. If the driver is accelerating the vehicle when the control switches to the ECU from the driver, there is typically a high torque load at the initiation of the torque reduction. In such a case, it may be desirable to not start dithering for a relatively long period of time compared to situations where there is a lower torque load.

The torque offset factor is a set amount that is offset from the calculated value using the above formula. The offset is determined experimentally once the other components have been calculated. If the final system with the variables and constants calculated as described above has a relatively constant offset above or below the actual torque value, the torque offset factor is added to bring the predicted value closer to the actual torque values. Moreover, the offset preferably results in a reduction in vehicle speed, rather than an increase in vehicle speed. Although it is anticipated that the transmission will be moved out of gear to neutral soon after the torque elimination is requested, while the torque elimination is ongoing the transmission is still in gear. As such, it would be preferable to err on the lower side rather than on the high side if there is some question as to which of the two would bring the actual fueling closer to the actual zero torque fueling.

Figure 4A:
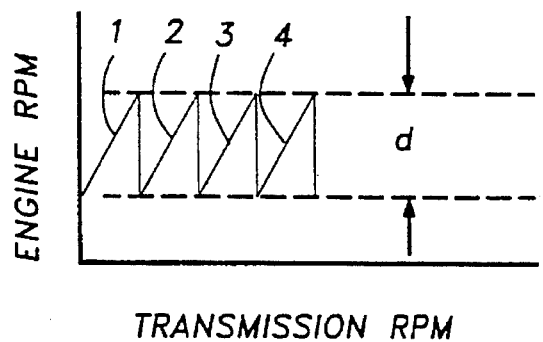
FIG. 4A is a graph showing another feature of the present invention.

Once the transmission is out of engagement, the electronic control unit begins to synchronize the engine input speed with that necessary for the current transmission output speed. As shown in FIG. 4A, this synchronization requires a rapid change in engine speed. FIG. 4A is a graph of engine speed relative to transmission speed at gears 1–4. The graph is an over-simplification, however, it does illustrate the main reason that speed synchronization is required. As shown, as engine speed increases in any one gear, the transmission output speed increases. At some point, that engine speed approaches an unduly high or low value, and at that point a shift is desirable. Thus, as shown at gear 1, the engine speed increases as does the transmission speed to a point where the operator has completed a shift to gear 2. To match the transmission speed ratio at gear 2 from that which was delivered at gear 1 prior to the shift, the engine speed should be reduced by an amount d. On the other hand, when downshifting from gear 2 to gear 1, the engine speed must be increased by that same amount d. It is this modification of the engine speed to match the desired gear ratio that is the synchronization described above.

Figure 4B:
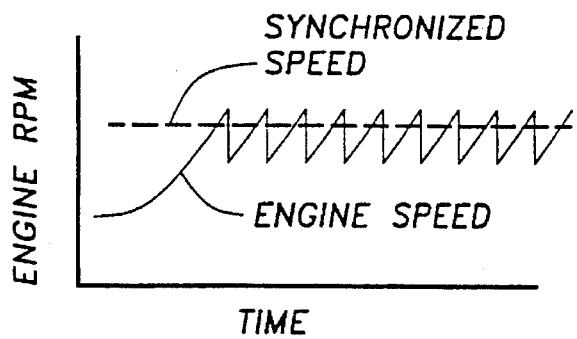
FIG. 4B is a graph showing another feature of the present invention.

FIG. 4B shows the actual engine speed being moved towards the actual synchronization speed based upon the transmission output. The actual engine speed includes an offset below the synchronization speed that would be calculated based upon the ratio. This offset is desirable since in the absence of an offset, should the gear teeth of the members to be engaged be slightly out of sync, and should the speeds be identically matched, it may not be possible to engage the gears easily. In addition, once the electronic control unit receives the signal from the inventive neutral switch that the transmission has moved out of full neutral and towards a transition to gear-engaged, the electronic control unit 31 preferably begins to dither or vary the speed above and below the predicted synchronization speed. As with the variation provided for the torque elimination, this variation will ensure that the actual engine speed will periodically match that necessary for actual synchronization of speed ratios. Since the transmission speed is changing during this adjustment, the desired engine speed must be repeatedly calculated and adjusted to match the desired ratio.

As the speed is synchronized to approach that required for actual synchronization, the operator is able to easily move the transmission members to engagement. While this movement is going on, the electronic control unit is monitoring the time it has required to engage the gear, and further other system signals. In particular, the electronic control unit starts a synchronization timer once the transmission is in neutral. The timer has a time identified to be more than would be required to complete the shift. When the synchronization timer has expired, a fault is identified and control of the engine is returned to the operator. In addition, if the electronic control unit 31 senses that the clutch has been actuated, either after movement to neutral, or as an alternative to the torque elimination feature, the electronic control unit returns control of the engine to the operator. If the intent switch changes, as will be described below, the electronic control unit ends the drive to the predetermined synchronization speed. Also, if the on/off switch 26 is off, the electronic control unit leaves control with the operator. In a completed shift, control returns to the operator once a signal is received that the transmission is engaged in the new gear.

Figure 5:
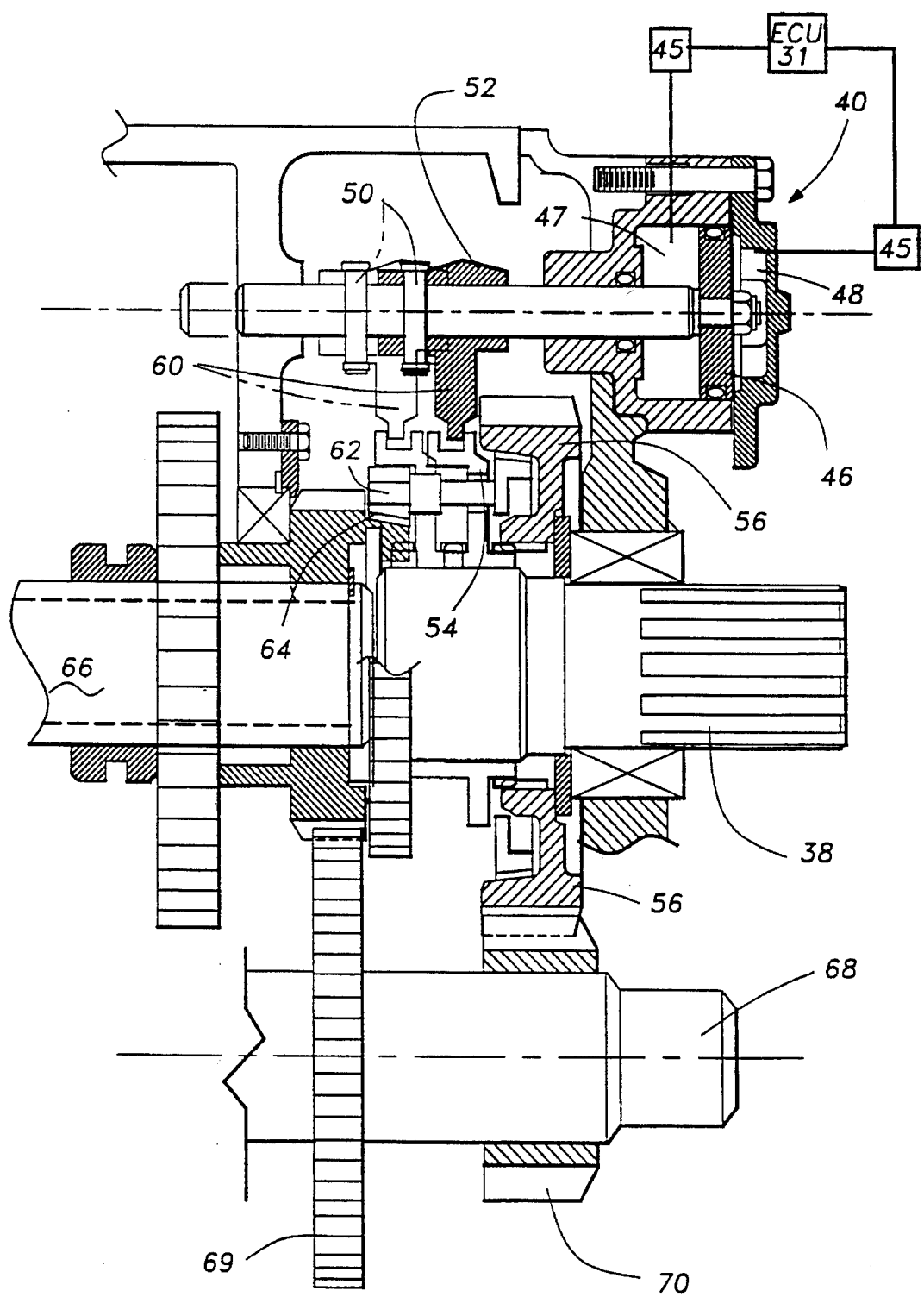
FIG. 5 a detail of a transmission range shift system.

FIG. 5 shows details of the range shift mechanism 44. This mechanism is as known in the art, and its operation will only be briefly described. A piston 46 defines two opposed fluid chambers 47 and 48. By selectively directing pressurized air to one of those two chambers, piston 46 can be caused to reciprocate. The electronic control unit 31 controls solenoid valves 45 to control the flow of pressurized air to the chambers 47 and 48. That aspect of the invention is inventive, although the mechanical details of the range shifting are as known in the art. Other types of range shift mechanisms could be utilized within the teachings of this invention.

A ring 50 slides a yoke 52 to move a collar 54. Collar 54 is shown engaging a gear 56 in the solid line position. Collar 54 is keyed to rotate with an output shaft 58. In the illustrated position shown in solid line, gear 56 drives collar 54 which in turn drives shaft 58. Collar 52 can also be moved to a position to the left in FIG. 5, as shown at 60 in phantom. At position 60, collar 54 no longer engages gear 56. Instead, collar 54 engages gear 64. Gear 64 is connected to be driven by the input shaft 66 from the main transmission. Shaft 66 typically drives gear 64, which drives counter shaft 68 through gear 69. Gear 70 is driven by counter shaft 68 to rotate gear 56. Range shifting is provided by selectively actuating a gear reduction through counter shaft 68, or disabling that gear reduction to the output shaft 38. In the solid line position, since gear 56 drives collar 54, the gear reduction is provided through the gears 69, 70 and 56. The solid line position is the low-speed range of the transmission. In the phantom position, the shaft 38 is constrained to rotate directly by gear 64. Thus, the gear reduction described above is not provided and the transmission operates at the high range of speed.

The ECU 31 determines when a range shift is necessary and selectively actuates the solenoid valves 45. The valves are driven to alternatively connect pressurized air to one side of piston 46, and to connect a dump-to-atmosphere to the other side of piston 46. By alternating the connection of pressurized air to one side of the piston 46, the range shifting can be controlled. Preferably the range shifting is initiated soon after the neutral signal is received by the ECU 31. The range shifting must occur when the transmission is in neutral. Further safeguards for ensuring that the range shifting does not take so long such that the gear is engaged are included.

The range shift may be initiated a short time after the speed synchronization has begun. As an example, the range shift may be triggered to be actuated once the speed synchronization has changed the engine speed by a set amount, such as 100 r.p.m.

As the speed synchronization continues, the ECU 31 monitors whether the range shift has been completed. A range shift timer is started which provides sufficient time for completing the range shift. If the operator begins to move the gear toward engagement (i.e., out of full neutral), and the range shift time has not yet expired, then the ECU 31 adds an offset onto the engine synchronization speed to eliminate tooth butting as the range shift is completed. As an example, an offset of some fixed number of r.p.m.'s can be added to the engine speed to prevent the problem of the gear teeth being offset, but in synch, as the range shift is completed.

If the on/off switch 26 is off, then the shift intent switch 28 orders a range shift. The upshift intent direction may be read as a direction to change the range to high, while the downshift direction may be read as a command to change the range to low. The range shift is completed once the operator has moved the transmission to neutral.

A logic may allow shift direction indication even without a switch, such as switch 28. By monitoring the speed of the engine and other factors, such as accelerator or brake position or status, the ECU 31 may be able to predict whether an upshift or a downshift is indicated. As an example, if the engine speed is above a certain threshold, an upshift could be expected, while if the engine speed is below a certain threshold, then a downshift could be expected.

Figure 6A:
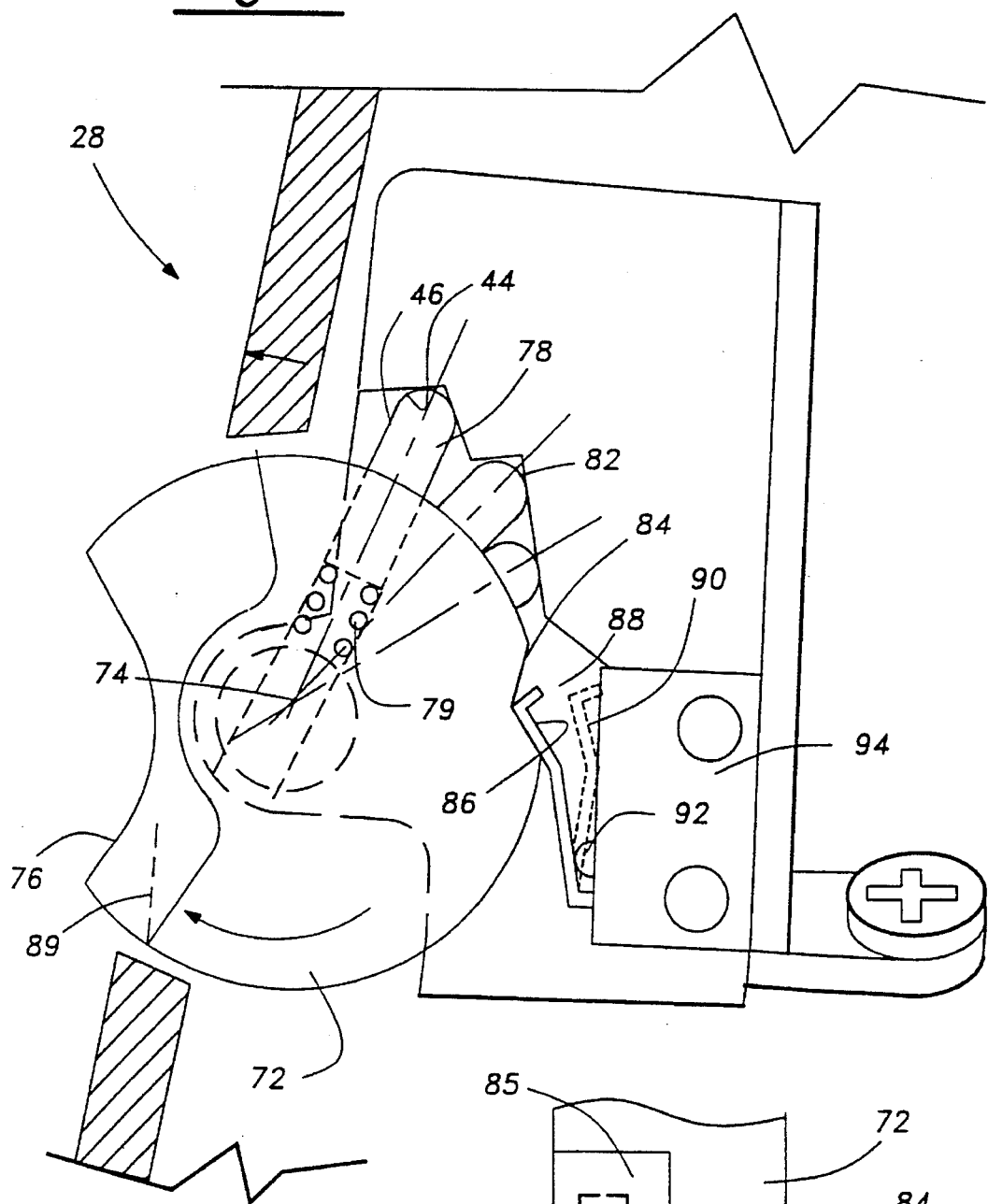
FIG. 6A shows a detail of an inventive switch.
Figure 6B:
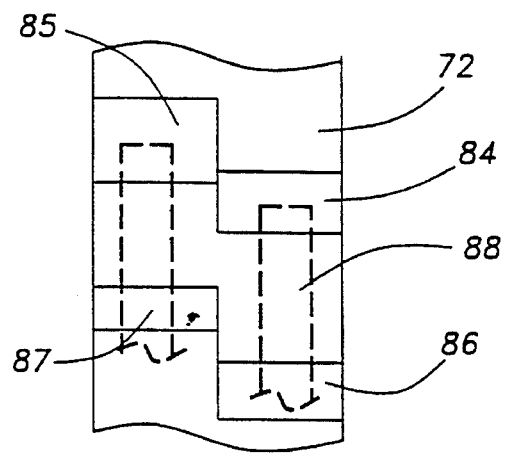
FIG. 6B shows other details of the switch.

FIGS. 6A and 6B show an inventive switch 28 for allowing the operator to signal both shift intent and a request for torque elimination through a single switch. A switch body 72 rotates about an axis 74 between two positions, one of which 76 is illustrated. A plunger 78 is driven by a spring 79 against two detents 80 or 82 to define two detent positions for the switch body 72. Once in one of the two detents 80 or 82, the plunger 78 holds the switch body 72 until an operator moves the switch body to the other position. A circuit is completed through a contact 87 when the switch 85 body is in one of the two positions. Contact 87 rides in a cam 85 that is spaced into the plane of the paper in FIG. 6A. Most preferably, in one of the two positions a circuit is completed through the contact 87, while in the other position no circuit is completed. The electronic control unit determines the position of switch body 72 by reading whether a signal is provided or whether no signal is provided. The electronic control unit associates the on or off state of the contact 87 as either an upshift intent or a downshift intent.

In either of the two positions, the switch may be moved beyond the upshift or downshift intent position a small additional rotational amount to a position such as that shown at 89 in phantom. At that position, the plunger 78 rides up the surface of the detent 80. When an operator releases the switch body 72 from position 89, the plunger will drive the switch body back to the illustrated intent position. In request position 89, the contact 88 is driven to position 90 by the ramps 84 and 86. At position 90, a ball contact 92 is driven downwardly completing a circuit within a switch box 94. A similar switch box is actuated by contact 87 when in the "on" position as described above. In the second intent position opposed from position 76, the switch would also be able to be rotated to the torque elimination, and the same circuit would be completed through ball 92. Thus, switch 28 provides a signal of whether an upshift or a downshift is intended, and selectively can send a torque elimination request signal. The electronic control unit is also counting the amount of torque elimination request signals received at any one time. The operator is able to direct the electronic control unit to facilitate skip or multiple shifting by repeatedly actuating the torque elimination request button. Thus, if an operator is to move up three gears on the next shift that operator will actuate the torque elimination request switch three times from the upshift position. The electronic control unit will then know that the next gear to be engaged is three higher than the currently engaged gear.

Figure 7:
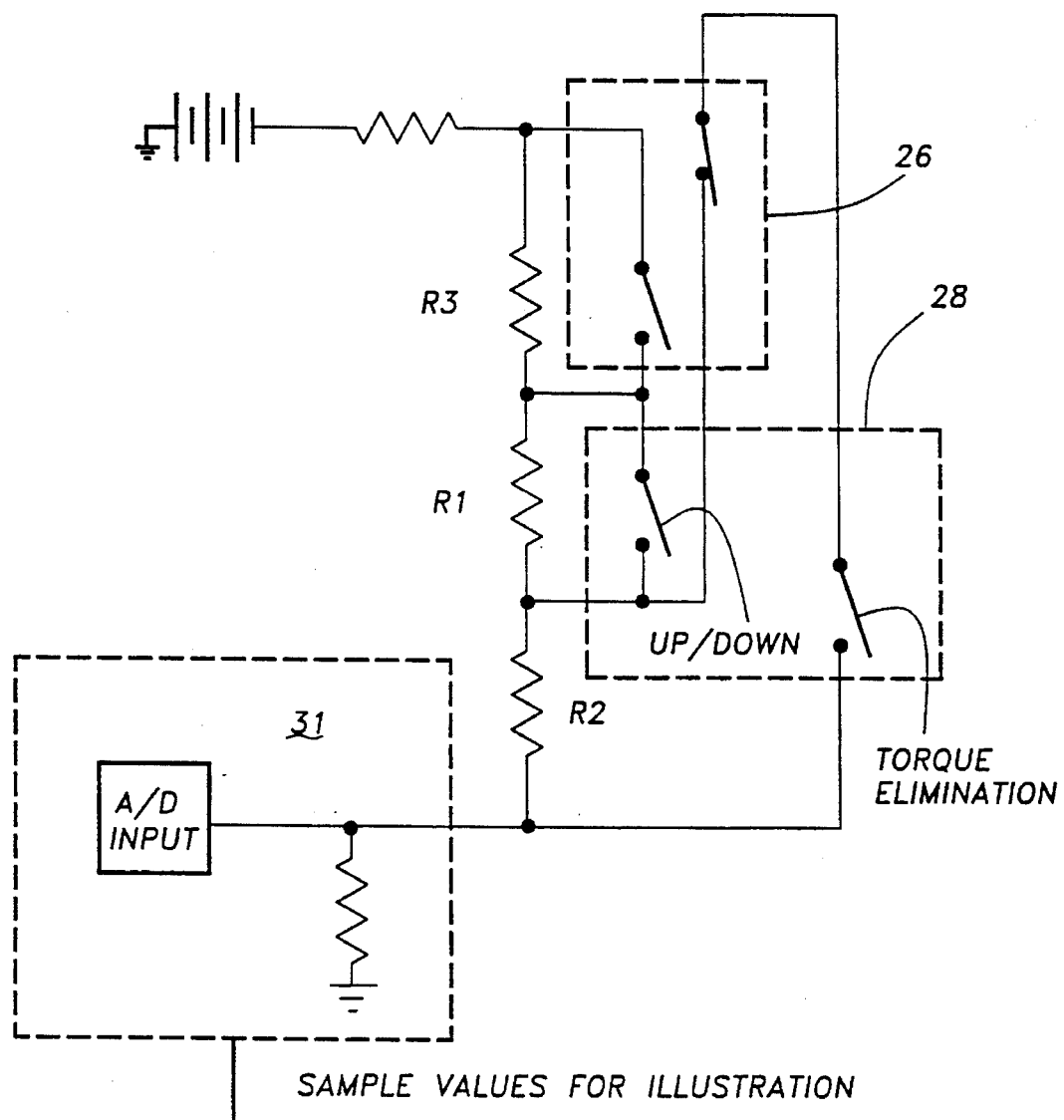
FIG. 7 is a circuit for providing operator signals.

A system for detecting a fault on the operator signal is described with reference to FIG. 7. As shown in FIG. 7, individual resistors are placed on a single input line to the ECU 31 from the three switch functions that are mounted within the stick shift 22. In particular, a first resistance R1 is applied when the shift intent switch is open. If there is no shift intent signal, then this resistance will be a portion of the combined analog signal delivered to the ECU 31. If however, the shift intent signal is in the on position, then the resistance will not be included in the analog signal. A second resistance R2 is mount parallel to the portion of switch 28 for the torque elimination request. A third resistance R3 is connected in parallel with the on/off switch 26. When switch 26 or the request switch are open, these resistances are applied. Thus, the electronic control unit 31 receives a combined analog signal that may have components of the three resistance R1, R2 and R3. By comparing the combined analog signal to possible signals and their ranges as shown in the box in FIG. 7, the ECU 31 can determine whether there is a fault on the signal from the operator input. The table shows gaps between the values for intermediate and several combinations of switches. Due to these gaps, the ECU 31 can identify when the combined signals do not fall within an expected range of analog value. If the ECU determines a fault by the analog signal not falling within an expected value, the electronic control unit does not begin synchronization of speed. Rather, a fault is identified, and control is left with the operator. The auto range control preferably stays with the control even if such a fault is identified. When a system is incorporated that will take control of the engine from the operator, it is important that there be checks on the quality of the signals. Thus, the above-described fault identification provides valuable benefits.

It is known in the prior art to compare analog signals to possible signals based upon resistances, and determine extreme signals as being a fault. It is, however, inventive to include intermediate ranges such as shown in the table of FIG. 7. The inventive system is capable of ensuring that operator signals are accurate before controlling the engine as described above.

Figure 8:
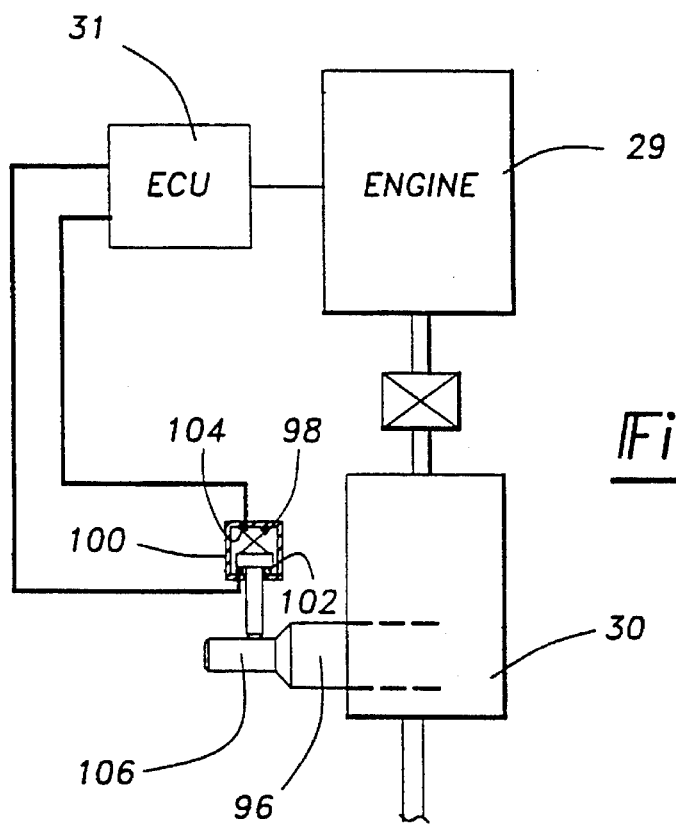
FIG. 8 shows a neutral switch feature of this invention.

FIG. 8 shows details of a neutral switch for providing a signal to the electronic control unit 31 of when the transmission is in neutral and when the transmission is in a gear-engaged mode. A neutral shaft 96 moves inwardly and outwardly of transmission 30, as the transmission moves between neutral and gear-engaged positions. A neutral switch 98 includes a housing 100 with two extreme axial positions 102 and 104. The neutral shaft 96 includes a forward relatively small diameter portion 106. A switch plunger 108 is biased out of housing 100. In this position, the plunger 108 abuts the extreme end 102 of the housing 100. A circuit is completed, and a signal is sent to the electronic control unit that the transmission is in gear-engaged mode. As shown, a similar signal can be sent from the opposed end 104 which is read as a determination that the gear is in neutral.

Figure 9:
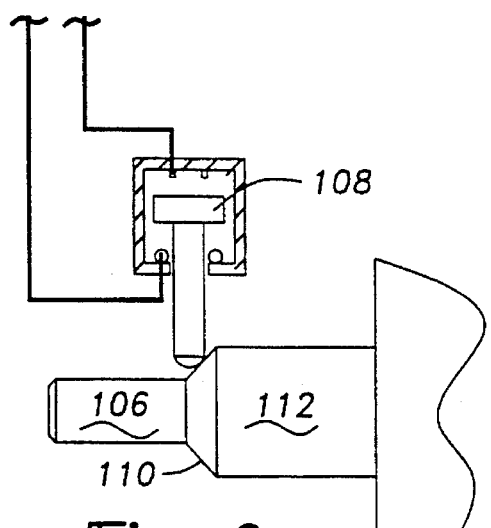
FIG. 9 shows the feature of FIG. 8 in a subsequent position.

In FIG. 9, the neutral shaft 96 has now moved outwardly relative to the transmission, and switch plunger 108 has moved away from either extreme end 102 or 104. The electronic control unit reads the lack of any signal between the ends 102 or 104 as an indication that the transmission is in transition. Fault detection is provided by counting the length of time the transmission is in this state. In the transition period, a ramped portion 110 of the neutral pin 96 has moved the plunger 108 away from the extreme end 102.

Figure 10:
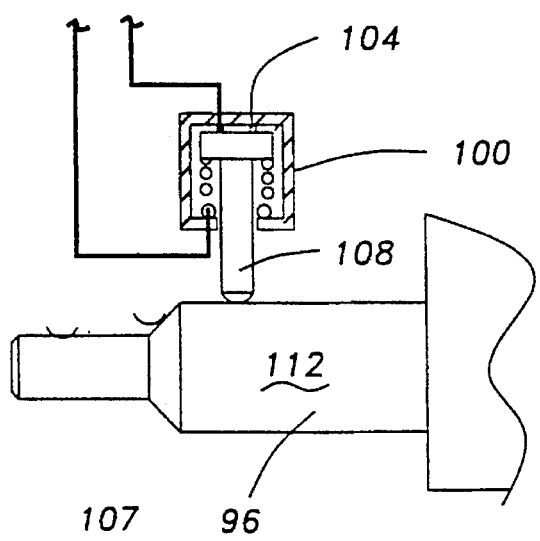
FIG. 10 shows the feature of FIG. 9 in a subsequent position.

The neutral shaft with the transmission in neutral is illustrated in FIG. 10. A relatively greater diameter portion 112 of neutral shaft 96 has now driven the switch plunger 108 to the extreme end 104 of the housing 100. At this position, a signal is also sent to the electronic control unit 31 that the transmission is now in neutral. With the inventive neutral switch, positive signals are sent to the electronic control unit of when the transmission is in neutral and when it is engaged. The electronic control unit thus is able to ensure that the speed modification will not occur until the transmission has moved out of engagement with a gear. Moreover, by counting the time between the actuation of the switches for gear-engaged and neutral, the electronic control unit can also monitor the operation of the switches.

The movement of the switch plunger 108 as shown in FIGS. 8–10, is more pronounced than might be the case in an actual production system. It is envisioned, that the switch plunger might simply move along the ramped portion 110, and be at one extreme of ramped portion 110 when in neutral, and at the other extreme when engaged. However, the movement illustrated in FIGS. 8–10 does serve to better illustrate the fact of the movement. Moreover, due to dimensional relationships, it may be necessary to include an intermediate pin between the switch plunger 108 and the neutral shaft 96.

Figure 11:
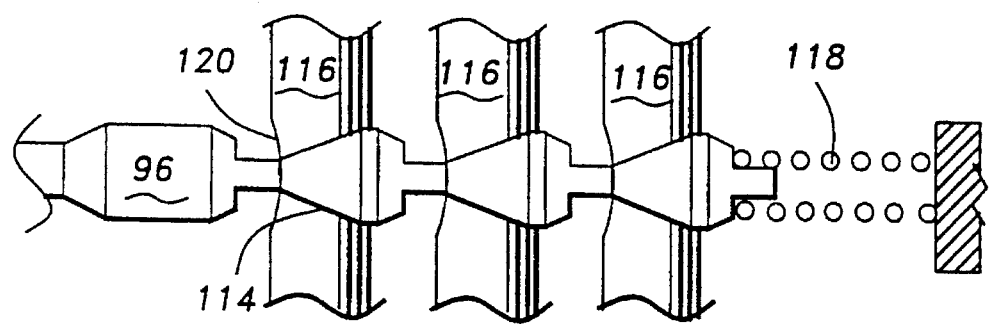
FIG. 11 shows a detail of a standard transmission.
Figure 12:
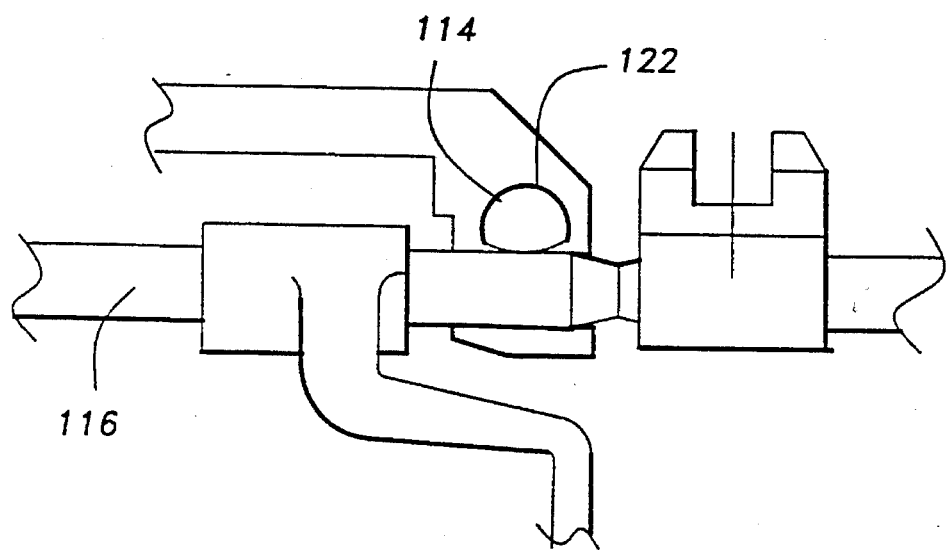
FIG. 12 shows another detail of the transmission shown in FIG. 11.

FIGS. 11 and 12 show the known structure for moving the neutral shaft 96. In the prior art the neutral shaft was used without the switch to provide a signal to a range shift valve of when the transmission was in neutral. As shown in FIG.

11, neutral shaft 96 includes frusto-conical portions 114 that are selectively engaged with portions of the shift rails 116 to cause movement of the neutral shaft 96. The neutral shaft 96 is biased to the neutral position shown in FIG. 11 (and in FIG. 10) by spring 118. In the neutral position shown in FIG. 11, a recessed portion 122 of the shift rail 116 is aligned with the frusto-conical portion 114. Thus, the spring 118 is allowed to drive the neutral pin 96 to the position shown in FIG. 10.

In FIG. 12, the shift rail 116 has now moved to engage a gear. Only one of the shift rails 116 will move from the position shown in FIG. 11 in a typical engaged position. Once the shift rail has moved, the recessed portion 120 is no longer aligned with the frusto-conical portion 114. Instead, a larger diameter portion 122 is aligned with the frusto-conical portion 114. This larger portion 122 forces the surface 114, and neutral shaft 96 to the right from the position shown in FIG. 11. This causes the transition movement shown in FIG. 9 from the position shown in FIG. 10 to the position shown in FIG. 8. Again, the structure for moving the neutral shaft is as known in the art. The invention would extend to any mechanical connection that provides a positive indication of when the transmission is engaged and when the transmission is in neutral.

There is also fault detection tier the neutral switch incorporated into the inventive system. As the neutral shaft 96 begins to move between the gear-engaged in neutral states, and is in the position shown in FIG. 9, there is no electric contact, and the ECU 31 does not receive a signal. The ECU 31 now knows if the transmission is in transition between engaged in neutral states. The electronic control unit monitors the time between the engaged and neutral states to identify faults. If the transmission is in "transition" for too long, a fault is detected. When such a fault is sensed, a counter is incremented. The counter may be decremented by a good shift wherein there is not a transition for too long a period of time. A good shift may decrement the counter by a greater number than a bad shift would increase the counter. A fault signal could be actuated in the vehicle cab should the number of identified faults indicate that a trend is beginning to indicate the switch is failing. That is, if the counter reaches a relatively high number indicating that faults are occurring on most shifts, then the signal could be actuated. On certain shifts the operator may himself control the operation such that the transmission is in transition for an unusual time. As such, the counter is decremented on a good shift. Preferably, even when the counter is decremented the total number of faults is retained in a second counter for diagnostic purposes.

On the other hand, if both switches are ever indicated as being engaged, a fault is also identified. Speed modification is aborted until a determination of the actual state is complete. In such a case, the speed ratio is compared to expected speed ratios and a determination is made as to whether the transmission is in gear or it is in neutral based upon whether the actual speed ratio matches an expected speed ratio as outlined above. Once this determination is complete, speed modification may be initiated.

Checks on the operation of the neutral switch provide valuable benefits when incorporated into the combined system. The electronic control unit is provided with positive signals of neutral and engaged states, and further the signals are checked to ensure that they are accurate.

Two other aspects of this invention provide further backup controls for an operator. First, an operator is provided with the ability to change shift intent after movement to neutral. If the ECU 31 receives a change in the shift intent signal from switch 28 after movement to neutral, the next expected gear is recalculated along with the synchronization speed. Also, any multiple shifts are cancelled. The original synchronization speed is deleted, and the electronic control unit begins to drive the engine to the new synchronization speed based upon the changed shift intent. The electronic control unit may limit the number of shift intent changes per shift. If more shift intent changes are received by the ECU 31 than the limit, then the ECU will return control to the operator.

Should an operator have a problem engaging a new gear, the operator is able to request second-chance shift assistance through actuation of the torque elimination request portion of switch 28. Should the torque elimination request switch 28 be actuated prior to expiration of the timer from a first actuation, then the ECU 31 counts the number of actuations and identifies a skip shift, as described above. However, should a signal be received after the transmission is in neutral, then the signal is read as a request for second chance assistance. Preferably, the signal must also be received after expiration of the speed synchronization timer. The electronic unit 31 then selects an optimal gear based upon the prior engaged gear, the shift intent, the engine speed, the brake status, and the transmission output speed. Essentially, the ECU stores an optimal operating engine r.p.m. value and matches the ratio of that optimal value and the transmission output speed to available ratios to find the closest match and identify an optimal gear. The synchronization speed at that gear is then determined as outlined above. The electronic control unit will move the engine speed to the desired speed at that time. The electronic control unit will also move the range to the proper range for the newly selected gear at that time. There are no limits to the number of second-chance assistance that can be actuated during any one shift. Also, second chance shifting may be used when the clutch has been used for movement to neutral.

As an option, during a second chance shift, the display 43 on the dash may identify the newly identified gear, and may flash that gear. The operator is thus provided with some direction as to which gear should be engaged. Moreover, the dash display 43 can identify other faults identified by the system as described above. The dash display can also display the next expected gear during routine shift assistance.

A further fall back or fault detection system is a "stuck in gear" identification. If the ECU 31 determines that the transmission has not been engaged after having identified a neutral position for a predetermined period of time, then the transmission checks to see if the gear is engaged. The ECU 31 accomplishes this check by checking the actual ratio of the transmission and engine speeds, and comparing that ratio to expected ratios. If there is a match, then it is determined that the transmission is in gear, and that a neutral switch fault has been identified.

Further, if the expected speed is different based on the above test, then the ECU estimates the torque applied by the engine, which may be found from the friction torque component as described above, and determines what the transmission should be if the transmission is in gear. If that predetermined speed approximates the actual transmission speed, then a fault or "stuck in gear" situation is identified.

If both indicate faults, the electronic control unit returns control of the engine to the operator.

The several events that would cause the basic speed synchronization system to abort and return control to the operator would also be in effect during second chance shifting or the late change shifting as described above.

Should a range shift be in progress during any one of those operations, the ECU 31 will typically complete the range shift. If the range shift has not been started, then the range will be left in the current range unless there is evidence that the driver is selecting a gear in the other range. One piece of evidence would be that the vehicle or engine speed is above any value desirable for the current range. Again, upper or lower thresholds are identified for each of the several gears, and the system compares the actual speeds to the thresholds to determine whether a range shift is necessary.

The engine speed retardation system is described as receiving a signal of when the upshift is occurring. However, the control may be less precise than a positive upshift signal. As an example, if the ECU desired speed is much lower than the actual speed, and if the transmission is in neutral, this could be seen as a signal to actuate the engine speed retardation system.

As set forth above, although a preferred embodiment of this invention does include a driver shift intent switch, the electronic control unit may be modified such that it can predict the shift direction. Additionally, although this invention is disclosed in a manual transmission wherein the transmission elements are moved through mechanical connections, the invention would also have application in systems wherein a manual input from the operator is translated into movement of the transmission elements through electronic or fluid controls. Also, while the invention achieves all control through a single ECU, the electronic control unit as used in this application extends to the use of several separate controllers.

Other aspects of the proposed system are disclosed in co-pending U.S. patent application No. 08/508,135 entitled "Engine Speed Synchronization System for Assisting a Manual Transmission Shift" still pending; U.S. patent application No. 08/508,067 entitled "Two-Position Neutral Switch for Multi-Speed Transmission" still pending; U.S. patent application No. 08/508,153 entitled "Four-Position Switch for Shift Assist System" still pending; U.S. patent application No. 08/507,996 entitled "Automatic Range Shift for Multi-Speed Transmission" still pending; U.S. patent application No. 08/508,307 entitled "Operator Input System for Gear Shift Assist Mechanism" still pending; U.S. patent application No. 08/508,111 entitled "Engine Speed Retardation for Transmission Upshift" still pending; and U.S. patent application No. 08/508,155 entitled "Method and Apparatus for Assisting and Shifting to Neutral still pending." The above-listed patent applications are all filed on even date with the present application.

A preferred embodiment of this invention has been disclosed, however, a worker of ordinary skill in the art would recognize that certain modifications will come within the scope of this invention. For that reason, the following claims should be studied to determine the true scope and content of this invention.

We claim:

1. A vehicle drive system comprising:

(a) an engine having an output shaft and an electronic control unit for controlling said engine;

(b) a multi-speed transmission operably connected to be driven by said engine output shaft;

(c) a manual stick shift to allow an operator to change the speed ratio of said transmission; and (d) a driver switch allowing an operator to send a shift intent signal to said electronic control unit of whether an upshift or a downshift is to be expected as the next shift, and further to allow an operator to request torque elimination on the connection between the transmission and the engine, said driver shift intent signal and said torque elimination request passing through a single input to said electronic control unit, and there being individual resistances associated with each switch state such that an analog signal received from said single input at said electronic control unit is associated with a particular combination of switch signals, said electronic control unit comparing said analog signal to expected signals in a table to identify the combination of signals being sent by said operator, said electronic control unit indicating a fault should said actual analog signal not fall within one of several ranges for said expected signals.

2. A vehicle drive as recited in claim 1, wherein said operator input switch includes an intent switch portion combined in a single switch with a torque elimination request switch, said torque elimination request actuating a second circuit.

3. A vehicle drive system as recited in claim 2, wherein an on/off switch is associated with a separate resistance such that the analog signal sensed by said electronic control unit is a combined signal of the state of the on/off switch, the shift intent signal, and the torque elimination request.

4. A vehicle drive system as recited in claim 3, wherein expected ranges for the combination of said three types of signals as set forth above have gaps between them, such that it is possible for there to be fault signals between the ranges of the expected signals.

5. A method of controlling the operation of a vehicle comprising the steps of:

(a) providing an engine having an output shaft, an electronic control unit for controlling the speed of said engine output shaft, said engine output shaft being connected to drive a multi-speed transmission through a clutch, and said electronic control unit being provided with information regarding a currently engaged gear in said transmission, and further to calculate the speed ratio at a next expected gear and determine a synchronization speed for the engine based upon the speed ratio at said next expected gear and the transmission output speed;

(b) operating a vehicle using the system provided in step (a);

(c) determining the currently engaged gear and whether an upshift or a downshift is to be expected as the next shift based upon system operating conditions;

(d) determining a next expected gear based upon said currently engaged gear and said expected shift of step (c);

(e) receiving a signal that said transmission has been moved to neutral and identifying an engine synchronization speed by multiplying the speed ratio at said next expected gear with the current transmission output speed and beginning to control said output speed of said engine output shaft to approach said synchronization speed;

(f) varying said engine output speed above and below said synchronization speed such that said engine output speed periodically crosses an actual required synchronization speed for said transmission; and (g) manually shifting said multi-speed transmission towards said next expected gear.

6. A method as recited in claim 5, further including the step of providing an offset to said desired engine synchronization speed of a set value such that said engine synchronization speed and said actual engine speed do not match identically for any lengthy period of time.

7. A method as recited in claim 5, wherein said electronic control unit periodically determines said currently engaged gear by monitoring the actual output speed of said engine and the actual output speed of the transmission, determining an actual speed ratio, comparing said actual speed ratio to expected ratios in a reference table, and updating a memory for said currently engaged gear if said determined currently engaged gear differs from that in said memory.

8. A method as recited in claim 7, wherein the determination of said currently engaged gear is made prior to the movement to neutral of step (c).

9. A method as recited in claim 5, wherein the determination of an upshift or downshift of step (c) is taken from an operator intent switch.

10. A method as recited in claim 9, wherein said operator intent switch is combined with an operator torque elimination request switch, and said electronic control unit reducing the torque load between said engine and said transmission upon receiving a torque elimination request signal.

11. A method as recited in claim 10, wherein said torque elimination request signal and said driver shift intent signal both come to said electronic control unit through a single analog signal, said electronic control unit being operable to determine combinations of said torque elimination request and said shift intent based upon the analog value of said single signal.

12. A method as recited in claim 11, wherein there is a second switch for enabling or disabling the speed synchronization system of this invention, said second switch also being connected to said single signal to said electronic control unit, and said electronic control unit also determining the state of said second switch based upon the analog value delivered to said electronic control unit.

13. A method as recited in claim 5, wherein said neutral signal is provided to said electronic control unit through a switch which is movable to provide a positive signal of a neutral state of transmission, and a positive signal of a gear-engage state for said transmission.

14. A method as recited ill claim 13, wherein said electronic control unit further monitors the period of time between the actuation of said gear-engage and said neutral states, and indicates a fault if said neutral switch does not provide a signal to said electronic control unit of either a gear-engage or a neutral state for a period of time that exceeds a predetermined period of time.

15. A method as recited in claim 13, wherein said neutral switch provides a signal to said electronic control unit of when said transmission has moved out of a full neutral state to approach a gear-engage state, and is in a transition state, and the variation of the engine speed as set forth in (f) begins once the electronic control unit receives a signal that the transmission has moved out of a neutral state towards a gear-engage state.

16. A method as recited in claim 5, wherein an additional speed reduction system is actuated to achieve said desired synchronization speed when an upshift is indicated.

17. A method as recited in claim 16, wherein said additional subsystem is the actuation of a engine braking subsystem.

18. A method as recited in claim 5, wherein said control of step (f) is aborted and control is returned to an operator after a predetermined period of time.

19. A method as recited in claim 18, wherein said control of step (f) is aborted and control is returned to an operator if a clutch actuation signal is received.

20. A method as recited in claim 5, wherein said stick shift controls components within said transmission to manually move components to change a speed ratio.

21. A method of controlling the operation of a vehicle comprising the steps of:
 (a) providing an engine having an output shaft, an electronic control unit for controlling the speed of said engine output shaft, said engine output shaft being connected to drive a multi-speed transmission through a clutch, and said electronic control unit being provided with information regarding a currently engaged gear in said transmission, and further to calculate the speed ratio at a next expected gear and determine a synchronization speed for the engine based upon the speed ratio at said next expected gear and the transmission output speed, said electronic control unit being able to identify an engine parameter that reduces the torque load on the connection between said engine and said transmission, said electronic control unit actuation also controlling of an engine speed retardation feature;
 (b) operating a vehicle using the system provided in step (a);
 (c) determining the currently engaged gear and whether an upshift or a downshift is to be expected as the next shift based upon system operating conditions;
 (d) driving said engine to said engine parameter which reduces torque load upon receipt of an operator indication that a gear shift is being initiated;
 (e) determining a desired engine synchronization speed at a next-expected gear by determining said next expected gear based upon said currently engaged gear and said expected shift of step (c);
 (f) receiving a signal that said transmission has been moved to neutral and identifying an engine synchronization speed by multiplying the speed ratio at said next expected gear with the current transmission output speed and beginning to control said output speed of said engine output shaft to approach said synchronization speed;
 (g) driving said engine output speed to approach said synchronization speed;
 (h) actuating said engine speed retardation feature if an upshift is indicated; and
 (i) manually shifting said multi-speed transmission towards said next expected gear.

22. A method as recited in claim 21, wherein said torque reduction is provided by predicting a zero torque parameter, and driving said engine to approach said predicted zero torque parameter as an operator attempts to manually move said transmission out of engagement.

23. A method as recited in claim 22, wherein said electronic control unit varies said actual engine parameter above and below said predicted zero torque value such that an actual engine parameter periodically matches an actual zero torque parameter, and said operator is able to move said transmission out of engagement to neutral.

24. A method as recited in claim 21, where an operator torque elimination request switch actuates the control of step (d).

25. A method as recited in claim 22, wherein said engine speed retardation feature is the application of an additional load on the engine.

26. A method as recited in claim 25, wherein said additional load is an engine braking subsystem.

27. A method as recited in claim 26, wherein said additional load added to the engine is the actuation of a fan.

28. A method of controlling the operation of a vehicle comprising the steps of:
 (a) providing an engine having an output shaft, an electronic control unit for controlling the speed of said engine output shaft, said engine output shaft being connected to drive a multi-speed transmission through a clutch, and said electronic control unit being provided with information regarding a currently engaged gear in said transmission, and further to calculate the speed ratio at a next expected gear and determine a synchronization speed for the engine based upon the speed ratio at said next expected gear and the transmission output speed;

(b) operating a vehicle using the system provided in step (a);

(c) determining the currently engaged gear and whether an upshift or a downshift is to be expected as the next shift based upon system operating conditions;

(d) determining a next expected gear based upon said currently engaged gear and said expected shirt of step (c);

(e) receiving a signal that said transmission has been moved to neutral and identifying an engine synchronization speed by multiplying the speed ratio at said next expected gear with the current transmission output speed and beginning to control said output speed of said engine output shaft to approach said synchronization speed;

(f) adding an offset to said synchronization speed, and begin varying said engine output speed to approach said synchronization speed, with said offset; and (g) manually shifting said multi-speed transmission towards said next expected gear.

29. A method of controlling the operation of a vehicle comprising the steps of:

(a) providing an engine having an output shaft, an electronic control unit for controlling the speed of said engine output shaft, said engine output shaft being connected to drive a multi-speed transmission through a clutch, and said electronic control unit being provided with information regarding a currently engaged gear in said transmission, and further to calculate the speed ratio at a next expected gear and determine a synchronization speed for the engine based upon the speed ratio at said next expected gear and the transmission output speed, and a driver shift intent signal to allow a driver to provide an indication of the next expected shift direction;

(b) operating a vehicle using the system provided in step (a);

(c) determining the currently engaged gear, and the predicted shift direction based upon said driver shift intent switch;

(d) determining a next expected gear based upon said currently engaged gear and said expected shift of step (c);

(e) receiving a signal that said transmission has been moved to neutral and identifying an engine synchronization speed by multiplying the speed ratio at said next expected gear with the current transmission output speed and beginning to control said output speed of said engine output shaft to approach said synchronization speed;

(f) receiving a change in the driver shift intent from said operator switch, after step (e), and recalculating said next expected gear based upon said change driver shift intent, and determining a new synchronization speed based upon said changed driver shift intent;

(g) moving said engine output speed to approach said synchronization speed; and (h) manually shifting said multi-speed transmission towards said next expected gear.

30. A method as recited in claim 29, wherein an operator is provided with the ability to request second-chance shift assistance by actuating a switch, said second-chance shift assistance identifying an optimal gear based upon at least said transmission output speed as said next expected gear, and driving said engine output speed towards a synchronization speed for said optimal gear, said operator then moving said multi-speed transmission towards said optimal gear.

31. A method of controlling the operation of a vehicle comprising the steps of:

(a) providing an engine having an output shaft, an electronic control unit for controlling the speed of said engine output shaft, said engine output shaft being connected to drive a multi-speed transmission through a clutch, and said electronic control unit being provided with information regarding a currently engaged gear in said transmission, and further to calculate the speed ratio at a next expected gear and determine a synchronization speed for the engine based upon the speed ratio at said next expected gear and the transmission output speed, and a driver second chance switch to allow a driver to request assistance in determining said next expected gear;

(b) operating a vehicle using the system provided in step (a);

(c) determining the currently engaged gear, and a predicted shift direction;

(d) determining a next expected gear based upon said currently engaged gear and said expected shift of step (c);

(e) receiving a signal that said transmission has been moved to neutral and identifying an engine synchronization speed by multiplying the speed ratio at said next expected gear with the current transmission output speed and beginning to control said output speed of said engine output shaft to approach said synchronization speed;

(f) receiving a request for assistance and recalculating said next expected gear based upon system conditions to determine an optimal gear and a new synchronization speed at said optimal gear;

(g) moving said engine output speed to approach said new synchronization speed; and (h) manually shifting said multi-speed transmission towards said next expected gear.

32. A method of controlling the operation of a vehicle comprising the steps of:

(a) providing an engine having an output shaft, an electronic control unit for controlling the speed of said engine output shaft, said engine output shaft being connected to drive a multi-speed transmission through a clutch, and said electronic control unit being provided with information regarding a currently engaged gear in said transmission, and further to calculate the speed ratio at a next expected gear and determine a synchronization speed for the engine based upon the speed ratio at said next expected gear and the transmission output speed, and a timer for determining the time after actuation of a speed synchronization system;

(b) operating a vehicle using the system provided in step (a);

(c) determining the currently engaged gear, and the predicted shift direction;

(d) determining a next expected gear based upon said currently engaged gear and said expected shift of step (c);

(e) receiving a signal that said transmission has been moved to neutral and identifying an engine synchronization speed by multiplying the speed ratio at said next expected gear with the current transmission output speed and beginning to control said output speed of said engine output shaft to approach said synchronization speed, and starting said timer;

(f) moving said engine output speed to approach said synchronization speed; and (g) returning control of the engine to operator control if said timer exceeds a predetermined time limit without movement of said transmission back to an engaged status.

33. A method as recited in claim 32, wherein actuation of a clutch by an operator also returns control of the engine to the operator.

34. A method as recited in claim 32, wherein said electronic control unit also controls the speed of said engine after step (g) and at the control of said operator.

* * * * *

UNITED STATES PATENT AND TRADEMARK OFFICE
CERTIFICATE OF CORRECTION

PATENT NO. : 5,582,558
DATED : December 10, 1996
INVENTOR(S) : Palmeri et al.

It is certified that error appears in the above-identified patent and that said Letters Patent is hereby corrected as shown below:

<u>Title page,</u>
Item [73], should read:

-- [73] Assignee: Rockwell International Corporation
Pittsburgh, PA

Detroit Diesel Corporation
Detroit, MI --

Signed and Sealed this

Eighteenth Day of March, 2003

JAMES E. ROGAN
*Director of the United States Patent and Trademark Office*